R. R. LAWRENCE.
BALANCED PHASE CONVERTER SYSTEM.
APPLICATION FILED JULY 24, 1916.

1,249,782.

Patented Dec. 11, 1917.

Inventor:
Ralph R. Lawrence,
by Roberts Roberts & Cushman
Attorneys.

UNITED STATES PATENT OFFICE.

RALPH R. LAWRENCE, OF DORCHESTER, MASSACHUSETTS, ASSIGNOR TO WESTINGHOUSE ELECTRIC & MANUFACTURING COMPANY, A CORPORATION OF PENNSYLVANIA.

BALANCED-PHASE-CONVERTER SYSTEM.

1,249,782.  Specification of Letters Patent.  Patented Dec. 11, 1917.

Application filed July 24, 1916. Serial No. 110,815.

*To all whom it may concern:*

Be it known that I, RALPH R. LAWRENCE, a citizen of the United States, and resident of Dorchester, in the county of Suffolk and State of Massachusetts, have invented new and useful Improvements in Balanced-Phase-Converter Systems, of which the following is a specification.

This invention relates to a system of converting current of one phase into current of a different phase, and more particularly the invention relates to means for maintaining proper phase relations and voltage conditions, throughout a wide range in variation of load, in a polyphase circuit connected with a phase converter. In the preferred form the invention comprises a single-phase circuit, a three-phase circuit, a rotary phase converter connected therebetween, and reactance coils in at least two of the branches of the three-phase circuit inductively linked together in such a way as to maintain proper phase displacements and voltages in the three-phase circuit throughout variations in load. However, it is not to be understood that my invention is limited to single-phase and three-phase systems, but it is to be understood that the invention is applicable to systems for converting current of any particular phase into current of any other desired phase.

It has been found desirable, for many purposes, to generate current of one phase and to convert the current so generated, either at the generating station or at a distant point, into current of a different phase, and sundry systems comprising special transformer arrangements or rotary phase converters have been designed to attain this end. One of the most satisfactory systems for the purpose is that illustrated and described in an article published by the Westinghouse Electric & Mfg. Co. of Pittsburg, Pa., in the *Electric Journal*, vol. XII, No. 6, June, 1915, pp. 261–264. Systems of this type, however, possess the inherent disadvantage of disturbing the phase relations and voltage conditions of a polyphase current to such an extent that they are impractical where normal phase relations and voltage conditions are important factors unless special means is provided to balance the system. One means of compensating for the tendency to disturb the voltage conditions is described in the article above referred to, but it is desirable to compensate for undue disturbance of the phase relations as well as for the disturbance of the voltages. Furthermore, it is desirable to maintain proper phase relations and voltage conditions not only at one particular load, such as full load or three-quarter load, but throughout the entire range of loads.

The principal object of my invention, therefore, is to provide means for maintaining proper phase relations and voltage conditions in a polyphase circuit receiving current from, or supplying current to, a phase converter, particularly of the rotary type. Other objects of the invention will be apparent from the following detailed description and accompanying drawings, in which—

Figure 1:
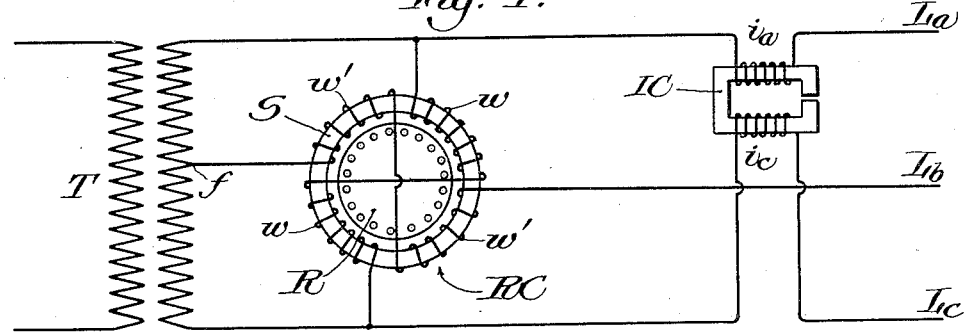
Figure 1 is a circuit diagram illustrating one embodiment of my invention.

In the particular embodiment of my invention illustrated in Fig. 1, T is an ordinary single-phase transformer, RC is a rotary phase converter, and IC is a reactance coil which may be of any approved type. The left-hand winding of the transformer may be connected to a single-phase circuit and the three right hand leads $L_a$, $L_b$ and $L_c$ comprise the three branches of a three-phase circuit which may be connected either to the source of power or to the load, depending upon whether the system is to be used to convert three-phase current into single-phase current or vice versa. The rotary phase converter RC preferably comprises an ordinary induction motor having two sets of windings $w$ and $w'$ on the stator S and having a rotor R of either the squirrel-cage type, as indicated, or other suitable type. The stator is shown as being of the Gramme ring type merely for convenience of illustration and in practice would of course be of suitable modern construction. One set $w$ of the converter windings is connected across the transformer circuit $L_a$, $L_c$, and the other set $w'$ of the windings is connected between an intermediate point preferably the middle point, of the transformer and the third phase $L_b$ of the three-phase circuit, the two sets of windings being wound in 90-degree phase relation with each other.

An essential feature of the system is that the voltage delivered to the three-phase circuit by the phase converter be substantially 86.6 per cent. of the voltage delivered to the three-phase circuit by the transformer, when converting single-phase current to three-phase current. Inasmuch as the windings $w$ function as motor windings and the windings $w'$ function as generator windings, this voltage condition can be attained in either of the following ways: The windings $w$ may be connected directly across the transformer secondary and the windings $w'$ have 86.6 per cent. of the turns of the windings $w$, as indicated in Fig. 1; or, the windings $w$ may be connected to points displaced inwardly from the ends of the transformer secondary such distances that the voltage supplied to the windings $w$ is only 86.6 per cent. of the voltage across the transformer, in which event the turns of windings $w'$ are equal in number to the turns of windings $w$.

Figure 2:
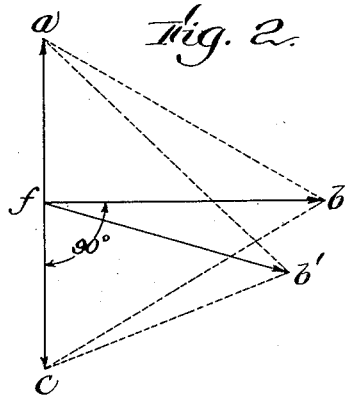
Figs. 2, 3 and 4 are vector diagrams illustrating the theory of operation of the system.
Figure 3:
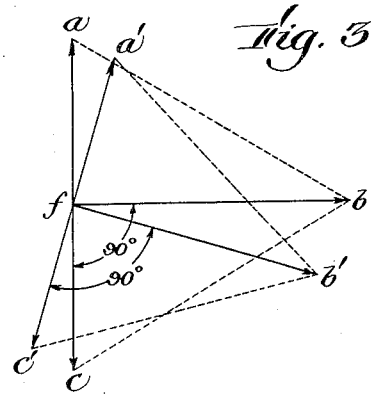

When converting single-phase current into three-phase current, the no-load voltage relations in the three-phase circuit are as indicated in Figs. 2 and 3, wherein $ac$ represents the single-phase electromotive force delivered from the transformer and $fb$ represents the electromotive force generated in the windings $w'$ of the converter, the latter being 86.6 per cent. of the former. Thus, with $fb$ at right angles to $ac$, the voltages between the three-phase leads, represented by $ab$, $bc$ and $ca$, respectively, are equal in magnitude and properly displaced in phase with relation to each other, that is, uniformly displaced in phase 120 degrees from each other. In the absence of balancing means, this symmetrical no-load condition becomes unbalanced as soon as a load is applied and as the load increases, the unbalanced condition rapidly increases, due to the change in the quadrature field, with load, and to the impedance drops in the windings of the converter. Since one phase of the converter acts as a motor while the other acts as a generator, the impedance drops cannot produce the same effect in the terminal voltage of each phase. In Fig. 2, for example, $fb'$, which represents the electromotive force generated in the windings $w'$ when the system is loaded, is both reduced in value and shifted in phase with relation to the electromotive force $ac$ across the transformer circuit.

By employing reactance coil IC having windings $i_a$ and $i_c$ connected in leads $L_a$ and $L_c$, respectively, in such relation that the magnetomotive forces produced by the currents in the two windings are 60 degrees apart, the phase position of the single-phase voltage, represented by $ac$, is caused to shift along with the phase position of the voltage generated by the winding $w'$ and represented by $fb'$. Thus, in Fig. 3, $a'c'$ represents the relative position of the single-phase voltage delivered from the transformer, under load, this voltage maintaining substantially a 90-degree relationship with the voltage $fb'$ generated by windings $w'$ throughout the entire range of loads. And due to the impedance of the windings $i_a$ and $i_c$ the voltage $a'c'$ is reduced to approximately the proper extent to make $a'b'$, $b'c'$ and $c'a'$ equal, whereby not only the proper phase relationship between the voltages of the three-phase circuit is maintained, but the three voltages are maintained substantially equal in magnitude throughout variations in load.

Figure 4:
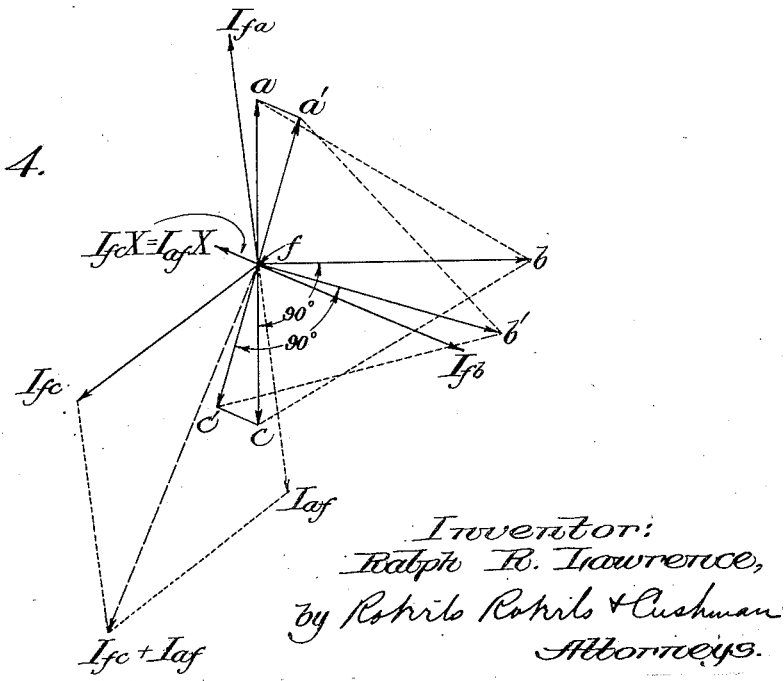

A theoretical representation of the conditions in my improved system, when power is being transferred from single-phase to three-phase, is set forth by the approximate vector diagram in Fig. 4, wherein the resistance drops are neglected in order to simplify the diagram. The vectors $ab$, $bc$ and $ca$ represent the no-load voltages across the three-phase line, $fb$ represents the voltage from the converter windings $w'$ which is in approximately 90-degree time-phase relation with the voltage $ac$ delivered from the secondary of the transformer T, and $fb$ is equal to 86.6 per cent. of $ac$. The three-phase currents under load, which are assumed to be equal and 120 degrees apart, are represented by the vectors $I_{tb}$, $I_{tc}$ and $I_{ta}$.

Now the resultant magnetomotive force acting on the mutual reactance IC is proportional to the sum of the currents $I_{tc}$ and $I_{af}$ flowing in the two windings of the reactance and, inasmuch as the flux in the mutual reactance is approximately in time phase with the resultant magnetomotive force, it produces a voltage in each of the leads $L_a$ and $L_b$ 90 degrees behind it, as indicated by $I_{tc}X$ and $I_{at}X$. The reactance voltage $I_{tc}X$ added to the voltage $fc$ gives the voltage $fc'$ and $I_{ta}X$ (which is equal to $-I_{at}X$) added to the voltage $fa$ gives the voltage $fa'$. The reactance voltages $I_{tc}X$ and $I_{ta}X$ each bear a 90-degree time-phase relation with the reactance voltage $bb'$ in the converter and if of the proper magnitude will, when load is applied, rotate the voltage $ac$, to a new position $a'$ $c'$ such that $a'$ $c'$ remains perpendicular to $fb'$. The voltage $fa'$ is equal to the voltage $fc'$ and the relation, $fb'$ equals 86.6 per cent. of $a'c'$, required for balanced three-phase voltages is maintained, whereby the three-phase voltages $a'b$, $b'c'$ and $c'$ $a'$ are equalized.

If the resistance drops are taken into account, the voltages will still be found to be balanced under balanced current loads, provided the ratio of the resistance drop to the reactance drop in the mutual reactance is the same as the ratio of the total apparent resistance drop to the total apparent reactance drop in the converter. A diagram similar to Fig. 4 applies when power is transformed from three-phase to single-phase.

The coil IC should be so designed that the reactance drops across the windings $i_a$ and $i_c$, due to the mutual reactance between the windings, is just sufficient to maintain the 90 degree voltage relation between $a'c'$ and $fb'$. A suitable way of accurately adjusting the amount of mutual reactance of coil IC comprises adjusting the length of the core air gap shown in Fig. 1. In the event that the proper balancing effect is not obtained the connections to one of the windings $i_a$ or $i_c$ should be reversed.

I claim:

1. A balanced phase converter system comprising a phase converter, a circuit for supplying current of one phase to the converter, a circuit for delivering current of a different phase to the load, one of the circuits being a three-phase circuit, and coils in two of the branches of the three-phase circuit inductively connected together in 60-degree relation with each other.

2. A balanced phase converter system comprising a rotary phase converter having at least two sets of windings, a transformer, a single-phase circuit connected to one side of the transformer, the other side of the transformer being connected to one set of the converter windings, a three-phase circuit having two leads directly connected to the latter side of the transformer, the other set of converter windings being connected to an intermediate point of the latter side of the transformer and to the other lead of the three-phase circuit, and a mutual reactance coil having windings in two leads of the three-phase circuit.

3. A balanced phase converter system comprising a rotary phase converter having at least two sets of windings, a transformer, a single-phase circuit connected to one side of the transformer, the other side of the transformer being connected to one set of the converter windings, a three-phase circuit having two leads directly connected to the latter side of the transformer, the other set of converter windings being connected to an intermediate point of the latter side of the transformer and to the other lead of the three-phase circuit, and coils in two leads of the three-phase circuit inductively connected together in 60-degree relationship.

4. A phase-converter system comprising a source of single-phase alternating-current, a three-phase load circuit, a phase-converting dynamo-electric machine, two mains of said three-phase circuit being connected directly to said source and the third main traversing said machine, and coils in said two directly connected mains inductively connected together in 60-degree relation with each other.

5. A balanced phase-converter system comprising a rotary phase converter having at least two sets of windings, a transformer, a single-phase circuit connected to one side of the transformer, the other side of the transformer being connected to one set of the converter windings, a three-phase circuit having two leads directly connected to the latter side of the transformer, the other set of converter windings being connected to an intermediate point of the latter side of the transformer and to the other lead of the three-phase circuit, and a mutual reactance coil having windings in the two leads of the three-phase circuit which are directly connected to said transformer.

6. A balanced phase-converter system comprising a rotary phase converter having at least two sets of windings, a transformer, a single-phase circuit connected to one side of the transformer, the other side of the transformer being connected to one set of the converter windings, a three-phase circuit having two leads directly connected to the latter side of the transformer, the other set of converter windings being connected to an intermediate point of the latter side of the transformer and to the other lead of the three-phase circuit, and coils in the two leads of the three-phase circuit which are directly connected to said transformer, said coils being inductively connected together in 60-degree relationship.

7. The combination with an unbalanced three-phase system embodying electromotive forces of major, intermediate, and minor values, respectively, of a transformer having considerable magnetic leakage and connected to derive energy from the phase of said major electromotive force and supplying said energy to the phase of said minor electromotive force to such a degree as to balance said system.

Signed by me at Boston, Massachusetts, this 20th day of July, 1916.

RALPH R. LAWRENCE.